United States Patent [19]

Graaff

[11] Patent Number: 4,964,530
[45] Date of Patent: Oct. 23, 1990

[54] BOTTOM PANEL FOR CONTAINERS
[75] Inventor: Wolfgang Graaff, Hildesheim, Fed. Rep. of Germany
[73] Assignee: Graaff Kommanditgesellschaft, Elze, Fed. Rep. of Germany
[21] Appl. No.: 298,418
[22] Filed: Jan. 18, 1989
[30] Foreign Application Priority Data
Jan. 21, 1988 [DE] Fed. Rep. of Germany ....... 3801700
[51] Int. Cl.$^5$ .......................... B65D 90/02; B65D 6/34
[52] U.S. Cl. ..................................... 220/442; 220/71; 220/72; 220/1.5
[58] Field of Search ............. 220/71, 72, 1.5, 441, 220/442

[56] References Cited
U.S. PATENT DOCUMENTS

| | | | |
|---|---|---|---|
| 3,166,829 | 1/1965 | Lemelson | 220/72 |
| 3,306,487 | 2/1967 | Gregoire | 220/1.5 |
| 3,359,752 | 12/1967 | Westling | 220/1.5 |
| 3,536,226 | 10/1970 | Tornay | 220/72 |
| 3,647,100 | 3/1972 | Russell-French | 220/1.5 |
| 3,889,486 | 6/1975 | Hickley | 220/1.5 |
| 4,143,588 | 3/1979 | Exler | 220/1.5 |

FOREIGN PATENT DOCUMENTS

| | | | |
|---|---|---|---|
| 1196585 | 11/1985 | Canada | 220/72 |
| 1484041 | 5/1967 | France | 220/72 |

Primary Examiner—George E. Lowrance
Attorney, Agent, or Firm—Alan H. Levine

[57] ABSTRACT

The subject matter of the invention is a bottom panel for ventilated containers. The bottom panel is provided with an upper surface plate layer (1) and a lower surface plate layer (2), both layers being held in position by means of a spacer layer (3) of rigid foam. The upper surface plate layer (1) is an extruded profile consisting of a flat plate (4) and rib profiles (5), whereby the rib profiles (5) have a cross section of closed hollow profiles. The closed hollow profiles can be used as ventilation channels (7), which are linked to the grooves (6) between the rib profiles (5) by means to openings (8).

5 Claims, 1 Drawing Sheet

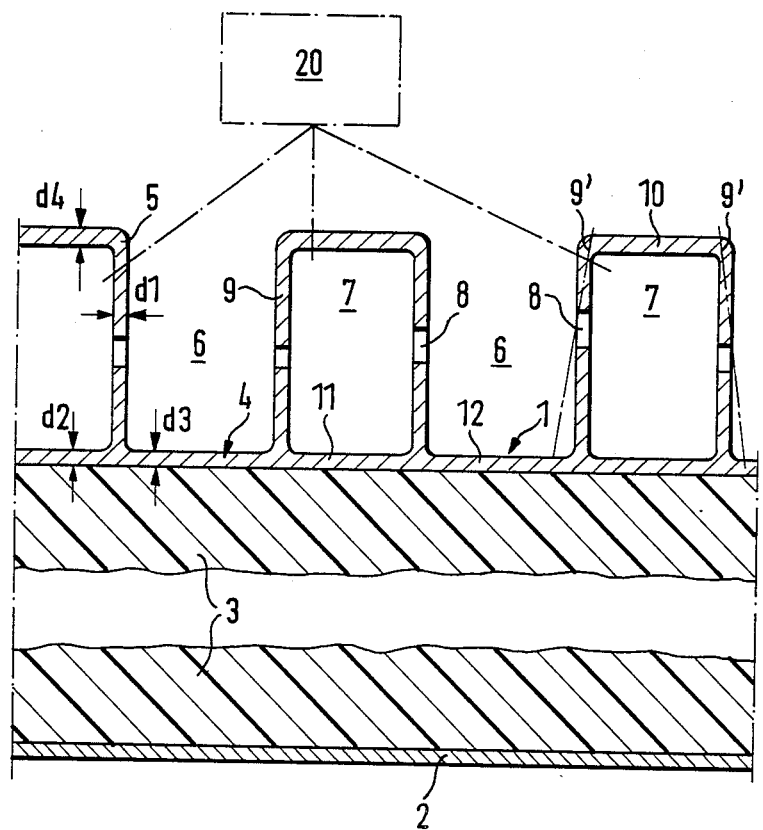

BOTTOM PANEL FOR CONTAINERS

The invention refers to a bottom panel for containers.

The bottom panel of containers, for instance cooling containers, is provided in general with ribs, which are arranged parallel to each other in the longitudinal direction of the container having as usual a cubical form. The provision of such ribs appears advantageous for reasons of stability, air circulation and ease of handling the freight. However, the provision of bottom panels with ribs reduces the ease of walking and driving especially in case of larger ribs spacings, which are desirable for air circulation. There is also the danger, that the ribs become bent in case the loading and unloading of freight is done by fork lifters being provided quite frequently with solid rubber tires. Such solid rubber tires are usually better adapted for heavy loads than air tires. In the case of use of solid rubber tires, however, steering movements of the wheels produce heavier loads on the ribs of such a bottom panel in the cross-direction than they would be in the case of air tires.

Up to now the bottom panels of containers usually are formed of so called sandwich panels being provided at the upper surface with the ribs. Such sandwich panels consist of an upper and a lower surface plate layer, the spacing in between being filled with rigid foam. During the introduction of the rigid foam, which is done usually by using liquid foam components, the same produces a solid connection with the surface plate layers. After solification the foam layer produces a good insulation in view of the air bubbles, while at the same time good mechanical strength is obtained by the multitude of bubble walls and the good connection to the surface plate layers. The ribs have a cross section of a "T", whereby the vertical bar is attached, respectively welded on both sides to the upper plate layer, while the lateral flange forms the upper surface of the bottom panel to be used for walking and driving on it. The ribs thereby form channels through which an air circulation can be obtained. These ribs, which increase the rigidity of the panel also have enough mechanical strength as long as they are not deformed. However, experience shows that during rough loading and unloading procedures the cross rigidity of the ribs is not sufficient. In case a fork lifter turns on the spot, which quite frequently due to limitations of space is necessary, the ribs are easily bent in the cross direction. If one of the ribs is bent in the cross direction, however, the same is no longer rigid in the vertical direction. As soon as a few ribs of the bottom panel of the container are bent, the whole bottom panel becomes quickly unusable and needs repair. At the same time the bottom panel can only be cleaned with great difficulty. Even knowing these disadvantages the discribed construction for bottom panels for containers is still used today to a large extent.

The rigidity and the ease of cleaning would be improved if the upper plate layer of the sandwich panel would have a trapezoid configuration. In such a case the grooves would not have overlapping sections, but would have vertical or angular flat side walls so that the cleaning could be made without any difficulty even using machinery. The lower and upper surfaces of the individual ribs could be designed in such a way that the ribs would be strong enough for all mechanical stresses. The bottom panel would have a much longer life expectancy and would be much easier to clean than bottom panels of standard design. As a disadvantage, however, it would appear that such a bottom panel with enough mechanical strength would have reduced cross sections for air circulation while at the same time the introduction of rigid foam would become more difficult if the number of openings for the introduction of the foam components and the ventilation should remain limited, which would be desirable in view of a simple procedure for making such a bottom panel. In addition there would be the risk that in case of torsion of the bottom panel nick effects would appear along the two edges of the bottom surfaces of the ribs leading to damage of the rigid foam layer, so that due to this reason such a bottom panel would become rather quickly damaged, whereby the repair of such a damaged bottom panel would appear much more difficult than a repair of a bottom panel having attached ribs. Such a bottom panel therefore would have certain advantages as compared to bottom panels of standard design. However, whether such a bottom panel all together would be preferable could only be determined by experience.

It is the object of the invention to provide a bottom panel for containers of the last mentioned type in such a way, that by avoiding the mentioned disadvantages the same is strong enough for supporting high mechanical stresses, that the same does not need a lot of repairs, that the same is easy to clean and that if necessary air circulation in an optimal way can be performed or at least there are no problems arising from the bottom panel preventing optimal air circulation.

In the following an embodiment of the invention is described with reference to the drawing showing a schematic sectional view of the bottom panel of a container according to the invention.

The drawing shows a section of a bottom panel for containers having a smaller dimension in the direction of the plane of the drawing than perpendicular thereto the latter being the length direction of the bottom panel. The two lateral ends of the bottom panel are not shown, because these ends are not necessary for understanding the invention. Equally the thickness of the bottom panel can be chosen rather arbitrarily.

The bottom panel consists as usual of an upper surface plate layer 1 and a lower surface plate layer 2, the spacing in between being filled by a spacer layer 3. Along the edges of the two surface plate layers 1, 2 there are arranged lateral profiles not shown, which form together with the two surface plate layers 1, 2 a hollow body. When making such a bottom panel the various elements are placed into a foaming mould, whereupon liquid foam components are introduced into the hollow body of the bottom panel, which then produce the foam thereby filling the whole hollow body without voids. This foam later produces a rigid connection between the surface plate layers and the edge profiles, so that the particular bottom panel can be used for the manufacturing of containers.

The particular construction of the upper surface plate layer 1 according to the invention is shown in the drawing. The upper surface plate layer 1 is an extruded profile, made out of metal or plastic. The particular surface plate layer 1 is provided with a flat plate 4, from which rib profiles 5 extend in such a way that the upper side of the flat plate 4 makes a transition into the rib profiles 5. These rib profiles 5 are actually closed hollow profiles having preferably a rectangular cross section being preferably oriented in the vertical direction.

For obtaining sufficient mechanical strength, while saving material at the same time, the upper plate layer 1 is an extruded profile having a nonuniform wall thickness. The thinnest walls are the vertical side walls 9 of the rectangular rib profiles 5. Increased values of wall thickness then occur in the areas of the bottom walls 11 of the rib profiles 5, the walls 12 within the grooves 6 and the upper walls 10 of the rib profiles 5 being the walls with the greatest thickness. As an example the following values can be mentioned:

thickness $d_1$ of the vertical side walls 9 of the rib profiles 5:2.0 mm thickness $d_2$ of the bottom walls 11 of the rib profiles 5:2.2 mm thickness $d_3$ of the walls 12 within the grooves 6:2.5 mm and thickness $d_4$ of the upper walls 10 of the rip profiles 5:3.0 mm.

The edges between the side walls 9 of the rib profiles 5 toward the upper walls 10 of the rib profiles 5 and toward the walls 12 within the grooves 6 are rounded as shown in the drawing.

Within the rib profiles 5 there are formed grooves 7 which can be used for ventilation. The cross section of the rib profiles 5, however, is determined according to the required rigidity. As shown in the drawing the side walls 9 of the rectangular rib profiles 5 are parallel to each other. Within the framework of the invention, however, there is the possibility that these side walls can be inclined to each other so that there mutual spacing increases at the bottom side (dotted lines 9' in the drawing).

Within the framework of the invention it is a particularly useful possibility to use the hollow interior 7 of the rib profiles 5 as ventilation channels 7, which in this case are well protected against dirt, which might make them useless. One or two of the ends of the rib profiles 5 are used in this case as air entries - in case of one end only, the other end might be closed - while along the side walls 9 of the rib profiles 5 there are provided openings 8 as air exits. These openings 8 can be distributed along the length of the rib profiles 5, while the diameter of these openings 8 are chosen such that optimal ventilation of the container is obtained from its bottom panel. By correct choice of the location and diameter of these openings 8 one can obtain an equal air distribution within the whole container, whereby also there is the possibility in case of various freights to create different ventilation areas.

The simplest way for providing ventilation is obtained by leaving the ends or at least one end of the rib profiles 5 open. During the transport of the container on railway cars or trucks the air pressure of the front side of the container will be enough so that ventilation air flows through the rip profiles 5 and from there into the inside of the container. However, the introduction of air to the rib profiles 5 can also be made by using cooling, heating or air conditioning equipment 20. The same applies for the grooves 6 between the rib profiles 5 as long as these grooves 6 are closed by the freight, in which case, however, no equal air distribution along the length of the container can be obtained. In case of providing fresh air from the outside it is necessary that the container is provided in the area of its roof with air exit openings allowing the exit of the air within the container. This air originally has been introduced in the described way through the bottom panel or by means of the cooling or air conditioning equipment if this equipment allows the passage of air. The introduction of air, however, requires that the rib profiles 5 are arranged in the longitudinal direction of the container.

I claim:

1. A bottom panel for a container, comprising:
   spaced apart upper and lower plates and a rigid foam between the plates,
   hollow ribs projecting upwardly from the upper plate, each rib having a rectangular cross-section, the two longer sides of the rectangle being substantially perpendicular to the upper plate and one of the shorter sides of the rectangle being formed by the upper plate,
   the ribs being spaced apart to define grooves between them, the bottom of each groove being defined by the upper plate and the top of each groove being open, whereby each groove will open into the container of which the bottom panel will form a part, the cross-sectional dimensions of the ribs and grooves being about equal,
   the exposed corners where the two longer sides of each rib meet its shorter sides being rounded, and
   the thickness of the upper shorter side of each rib being greater than the thickness of bottom plate portion forming the base of each groove, the latter being thicker than the bottom plate portion forming the lower shorter side of each rib, and the latter being thicker than each of the two longer sides of each rib.

2. A bottom panel as defined in claim 1 including openings in the longer sides of each rib through which the interior of the rib communicates with the grooves on each side of the rib.

3. A bottom panel as defined in claim 2 including means closing the ribs and grooves at one end of the bottom panel, and means for connecting the other ends of the ribs and grooves to a source of air pressure.

4. A bottom panel as defined in claim 3 wherein the source of air pressure is a means for heating, cooling, or conditioning air.

5. A bottom panel as defined in claim 1 wherein the upper plate and ribs are formed as a single piece of extruded material.

* * * * *